June 2, 1964
D. K. McLEAN
3,135,629
PIPELINE COATING UNIT
Filed July 31, 1961
2 Sheets-Sheet 1
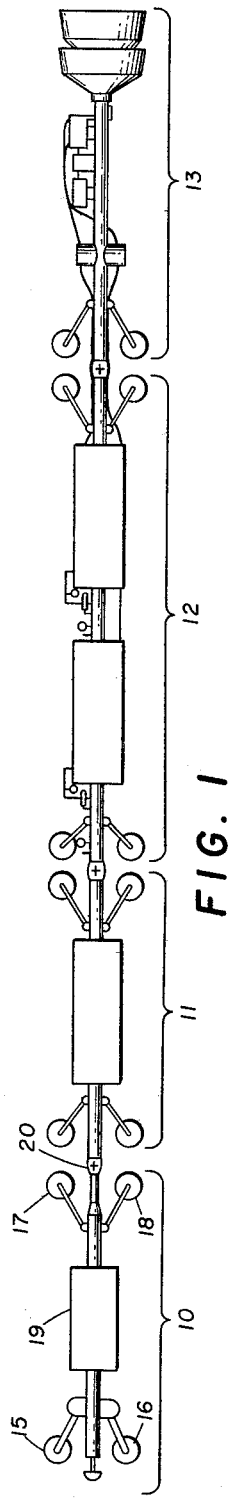
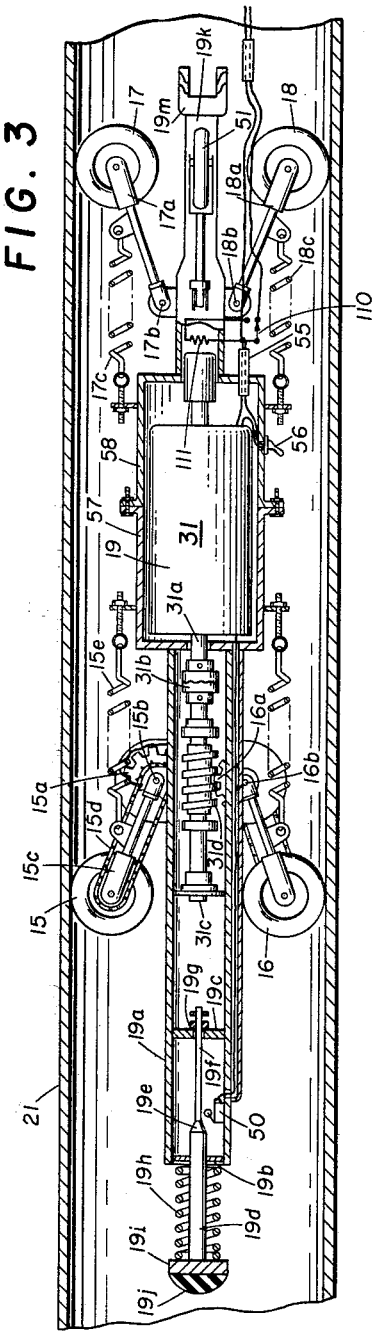
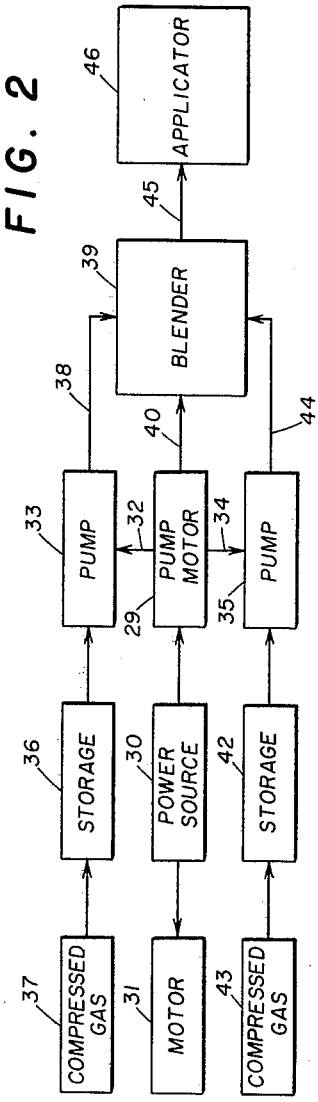
DOUGLAS K. McLEAN
INVENTOR.
BY D. Cave Richards June 2, 1964  D. K. McLEAN  3,135,629
PIPELINE COATING UNIT
Filed July 31, 1961  2 Sheets-Sheet 2
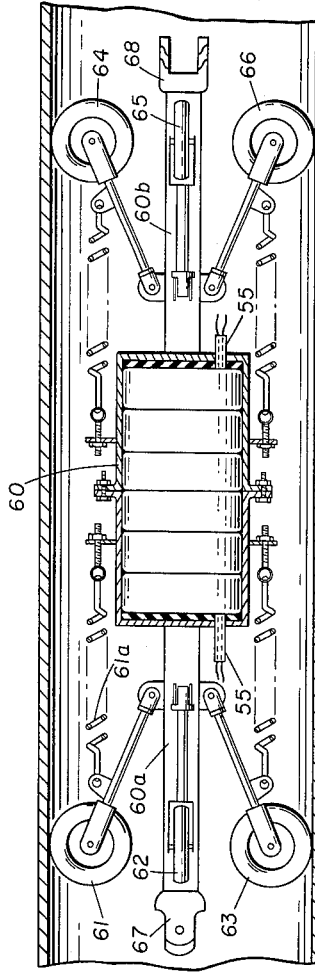
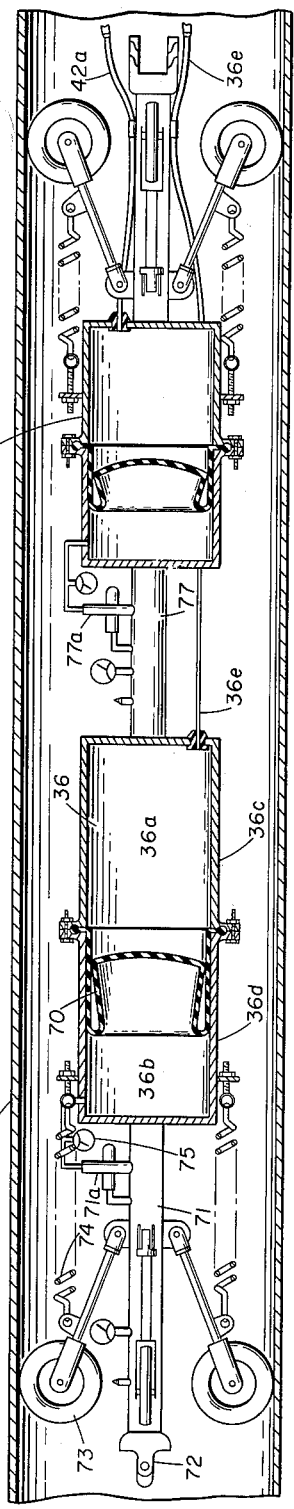
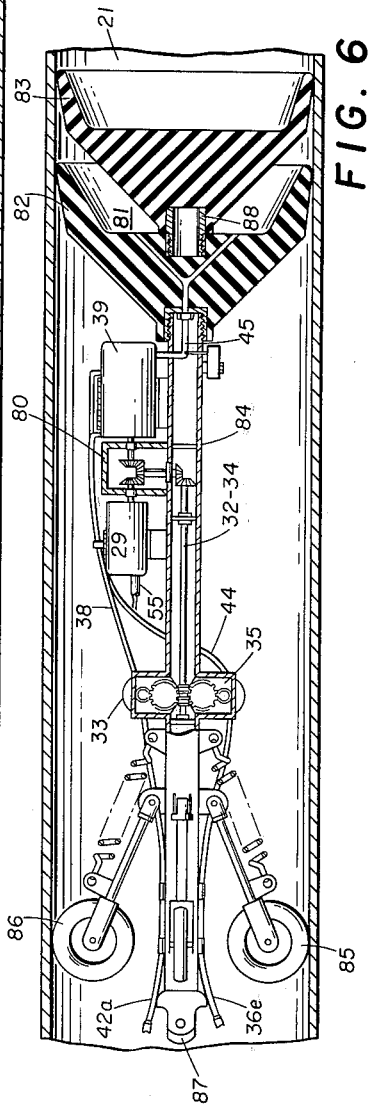
DOUGLAS K. McLEAN
INVENTOR.
BY

United States Patent Office 3,135,629
Patented June 2, 1964

3,135,629
PIPELINE COATING UNIT
Douglas K. McLean, Dallas, Tex., assignor to Harvest Queen Mill & Elevator Company, Dallas, Tex., a corporation of Texas
Filed July 31, 1961, Ser. No. 128,256
2 Claims. (Cl. 118—408)

This invention relates to treating and inspecting pipelines and more particularly to a system for use in a pipeline, the motion and operation of which are controlled by an internally-carried transducer. In a more specific aspect, the invention relates to a pipeline unit which is coupled to pipeline walls for interchange of a mechanical force therewith for control of the unit. Further, the invention relates to an articulated system which may be propelled through a pipeline and which will negotiate directional changes therein while performing a prescribed function.

This application is a continuation-in-part application of application Serial No. 10,792, filed February 24, 1960, and application Serial No. 29,371, filed May 16, 1960, both now abandoned.

In operations relating to the installation and maintenance of pipelines, it has been found desirable to propel a unit through the pipeline of substantial length either to determine the character of some feature of the pipeline or to remedy some condition therein. In accordance with Patent No. 2,480,358 to Curtis et al., there is disclosed a system for applying to the inside of a pipeline a protective coating which will minimize corrosion and extend the pipeline life. In such systems it has been found desirable to be able to control the speed at which the unit travels through the pipeline. In some cases and as discussed in the Curtis et al. patent, a differential pressure is applied across a moving system to control the speed and the quality of the coating operation. However, often it is not practical to utilize differential pressures in the manner disclosed in the Curtis et al. patent. Furthermore, it is often necessary to carry out operations which are not necessarily dependent upon the existence of such pressure. Therefore, in accordance with the present invention, there is provided an articulated system which may be self-controlled and will operate in a pipeline to perform any one of a number of different treating or observation functions.

For a more complete understanding of the present invention and for further objects and advantages thereof, reference may now be had to the following description taken in conjunction with the accompanying drawings in which:

FIG. 1 is a view of one embodiment of the invention;
FIG. 2 is a block diagram of elements of FIG. 1;
FIG. 3 is a sectional view of a front portion of the system of FIG. 1;
FIG. 4 is a sectional view of an intermediate portion of the system of FIG. 1;
FIG. 5 is a sectional view of another intermediate portion of the system of FIG. 1;
FIG. 6 is a sectional view of the trailing portion of the system of FIG. 1; and
FIG. 7 is a modified applicator system.

In FIGS. 1–6 there is illustrated an embodiment of the present invention which comprises an articulated pipeline unit which is adapted to be moved through the length of a pipeline under its own power. This unit includes a storage system for carrying an energy source and materials to be applied to the inner wall of the pipeline.

Referring to FIG. 1, there is illustrated an assembled unit which includes a traction unit 10 with an energy source 11 coupled thereto and in turn coupled to a coating materials unit 12. Trailing the coating materials unit 12 is an applicator unit 13. Each of the units 10–13 is provided with means to maintain a predetermined spaced relation between the walls of an enclosing pipeline and the equipment carried thereby. For example, unit 10 is provided with two sets of rollers. The leading rollers 15 and 16 and the trailing rollers 17 and 18 position the body 19 generally at the center of an enclosing pipeline. Unit 10 is coupled by a link 20 to unit 11. By articulating the system in the manner shown, even though the unit of substantial length is provided, the separate units are such that they can be accommodated within pipelines having curves therein which are fairly sharp. The system may be made to operate even though changes in direction of the pipeline are encountered.

The system embodied in the unit of FIG. 1 is schematically illustrated in the block diagram of FIG. 2. A source of energy as from the bank of batteries 30 is applied to a motor 31. Motor 31 serves to propel the system through the pipeline. Energy from battery 30 is also applied to a pump motor 29. Pump motor 29 is connected by way of linkage 32 to a regulated pump 33 and by way of linkage 34 to a regulated pump 35. A coating material such as an epoxy resin stored in a unit 36 is forced under compressed nitrogen from tank 37 to the pump 33 which in turn pumps the epoxy resin by way of channel 38 into a blender 39. Pump motor 29 is coupled by way of linkage 40 to drive the blender 39. A catalyst for the epoxy resin stored in unit 42 is applied to the pump 35 by compressed nitrogen from tank 43. The catalyst from pump 35 then is transmitted by way of channel 44 to the blender 39 where a catalyst and the epoxy resin are mixed together for application to the pipeline walls. The mixture is transmitted by way of channel 45 to an applicator unit 46.

The functions of the apparatus shown in FIG. 1 are such as to drive the unit through the pipeline and while traveling apply to the inner walls of the pipeline an epoxy resin coating of a desired thickness thereby to protect the inner walls of the pipeline against corrosion.

Details as to construction of one embodiment of the system diagrammatically shown in FIG. 2 are illustrated in the sectional views of FIGS. 3–6. The leading section 10 of the unit of FIG. 1 is shown in FIG. 3.

More particularly, the body 19 of FIG. 3 houses the motor 31. Extensions of the housing 19 are provided to support the rollers 15, 16, 17 and 18. More particularly, an extension 19a extends forward of the housing 19. The extension 19a may be of the form of a tube which is closed at the forward end by a disk 19b. A bulk head 19c is provided at an intermediate point. The disk 19b and bulk head 19c serve to support a stop unit, including a sensing element which extends beyond the end of the section 19a. More particularly, a rod 19d extends through the disk 19b. Rod 19d is of reduced diameter having a beveled face 19e. The extension 19f passes through the bulk head 19c and is provided with a nut 19g which serves normally to position the rod 19d. A spring 19h encircles the rod 19d and exerts a force forward against the end 19i. Secured to the end plate 19i is a resilient mass 19j. A switch 50 is mounted inside the tube 19a and is adapted to be actuated by contact with the beveled shoulder 19e to de-energize motor 31 when the unit reaches the end of a pipeline or an obstruction therein.

The motor shaft 31a extends into the tubular member 19a and is coupled by coupling 31b to a shaft 31c which carries a worm gear 31d thereon. Shaft 31c is suitably journaled to be rotated and driven under control of the motor 31. A gear 15a is mounted on a shaft 15b and meshes with the worm gear 31d. Similarly, a second gear 16a is mounted on a shaft 16b and is so mounted as to mesh with the worm gear 31d. An arm 15c carrying the roller 15 is pivotally mounted for rotation about the shaft 15b. A linkage in the form of a chain link belt 15d serves to couple the gear 15a to the wheel 15. The arm 15c is urged outwardly toward the wall of the pipeline 21 by a spring 15e.

A similar construction is provided for linking the wheel 16a to wheel 16 and for urging wheel 16 toward the wall of the pipeline 21.

Trailing the motor 31 is an extension 19k which is terminated by a coupling 19m. The extension 19k supports the arms 17a and 18a which in turn support the rollers 17 and 18. The arms 17a and 18a are pivoted about points 17b and 18b, respectively, and are urged outwardly against the wall of the pipeline by springs 17c and 18c, respectively. It will be understood from an examination of the trailing portion of FIG. 3 that two additional rollers are provided for cooperation with rollers 17 and 18 to maintain the housing 19 substantially centered in the pipeline. The roller 51 has been illustrated as carried by the extension 19k and is biased by means not shown as are the wheels 17 and 18 into engagement with the pipeline wall. Similarly, the front end of the unit of FIG. 3 is provided with an additional pair of wheels, neither of which is shown. In a preferred embodiment of the invention a tricycle arrangement is provided at both ends of the housing 31 rather than the four-roller system. However, the four-roller system has been adopted for the purpose of the present description because of the clarity with which it may be illustrated.

Power is supplied to the motor 31 by way of a cable 55. A control switch 56 is shown connected in the circuit leading to the motor 31 for initially setting the system into operation. As illustrated, the motor 31 is mounted within a pair of cups 57 and 58 which are centrally joined to form a closed container. The bulk head in which the shaft 31 is journaled may also serve as a closure for the extension 19a so that the motor 31 is maintained in a pressure-tight chamber. The gears 15a and 16a are mounted in a suitable housing, shown broken away in the region of the gear 15a. Protective coverings for the working parts thus provided may in some cases be dispensed with.

Referring now to FIG. 4, there is illustrated an intermediate section of the unit of FIG. 1 in which a battery compartment 60 houses a plurality of batteries which are connected by way of a cable 55 to the motor 31 of FIG. 3. The batteries are mounted in the central housing 60 with extensions 60a and 60b supporting forward centering wheels 61, 62 and 63 and rear centering wheels 64, 65 and 66, respectively. A coupling 67 is provided for connecting to the coupling 19m of FIG. 3. A coupling 68 is provided for connection to the next succeeding trailing unit. The wheels 61–66 are urged outwardly into engagement with the walls of the pipeline 21 as by means of the springs, such as spring 61a.

The cable 55 connected to batteries in housing 60 extends rearward to the section of the system shown in FIG. 6, as will hereinafter be described. Energy transmitted rearward from the batteries is utilized for controlling the spreading of a film on the inner walls of the pipeline 21. More particularly, supply units for the coating material are carried in the section illustrated in FIG. 5. A first tank 36 is provided for storage of a resinous compound. The tank 36 is cylindrical in shape, being formed from two cups 36c and 36d which are joined at a central seam. A cup-shaped liner 70 is secured between the lips of the cups 36c and 36d. The liner 70 is adapted normally to completely line one-half of the cylinder 36. The liner 70 thus forms a flexible, movable partition within the container 36 and serves to divide the same into two compartments 36a and 36b.

Extending forward from the container 36 is a tubular member 71 which serves as a storage tank in which there is injected at high pressure a quantity of nitrogen gas. A coupling member 72 is secured to the end of the extension 71. Positioning wheels, such as the wheel 73, are mounted for rotation relative to the extension 71 and are urged into engagement with the walls of the pipeline 21 by springs, such as spring 74. Nitrogen stored in the extension tank 71 is injected through a pressure regulator 75 into the zone 36b in storage tank 36. A suitable epoxy resin for forming a coating is initially placed in the section 36a. Initially the liner 70 engages the walls of the container 36 so that the section 36a comprises substantially all of the container, whereas the section 36b would be negligibly small. Upon opening of a valve (not shown) leading from tank 71 to section 36b, pressure would be applied through the liner 70 to the epoxy resin to force it by way of channel 36e to an applicator unit in the trailing section. In a similar manner there is provided a catalyst storage tank 42 trailing the coating storage tank 36 and connected thereto by a tubular linkage 77.

The tubular linkage 77, like the extension 71, forms a storage tank for nitrogen gas maintained under pressure so that catalyst in the storage tank 42 may be forced from the storage tank by way of the channel 42a to the applicator unit in the trailing section.

The pressurized nitrogen maintained in the extension 71 and the linkage 77 passes through flow regulators 71a and 77a in order that the rate at which the coating material and catalyst are fed by channels 36e and 42a may be predetermined.

The blender 39 and the coating applicator 46 are illustrated in FIG. 6. The channels 42a and 36e lead to the blender unit 39, passing through the pumps 33 and 35, respectively. The output flow lines from the pumps 33 and 35, namely, the channels 38 and 44, lead to the blender input ports. The pump motor 29 drives a transmission unit 80 which is coupled to the blender 39. The unit 80 is also coupled by the linkage 32—34 to the pumps 33 and 35. Coating material and catalyst are mixed thoroughly in the blender 39 and then delivered by way of channel 45 to the zone 81 between the two trailing cups 82 and 83. The cup 82 is connected to the trailing end of a central support member 84. Wheels, including the pair of spacer wheels or rollers 85 and 86, support the front end of the central support member 84. A universal coupling unit 87 is connected to the lead end of the central support member 84. The cup 83 is secured to the cup 82 by the coupling unit 88.

The catalyzed coating material deposited in the zone 81 is forced outwardly along the trailing lip of the cup 83 and is thereby spread as a relatively thin coating on the inner wall of the pipeline 21. The construction of the cups 82 and 83 may be varied to control the thickness of the coating.

More particularly, in FIG. 7 there has been illustrated a modified form of spreading unit in which a pair of fluid-filled chambers are employed for engaging the inner walls of the pipeline at longitudinally spaced points. The leading element 100 may serve in place of the leading cup 82 of FIG. 6. The trailing element 101 may serve in place of the trailing cup 83. The lead element 100 is provided with internal channels from the blender 39 connected to the coupling 102 and leading to the zone 103 between the elements 100 and 101. A ring-shaped tube 104 forms the terminal portion of the element 100. A similar ring-shaped tube 105 forms the terminal portion of the trailing tube 101. The pressure on the inside zones 106 and 107 of the tubes 104 and 105 controls the pressure applied to the inner surface of the pipeline 21 thereby to determine the coating thickness. As indicated by relative degrees of deformation, the pressure in the zone 106 is substantially in excess of that in zone 107 so that extrusion of the coating material forwardly of the unit 100 would be prevented and the extrusion along the pipeline wall at the trailing contact in the region of zone 107 would be facilitated.

It will be noted that the conductors extending from the pump motor 29 form a part of the cable 55. The motor is thus energized from the batteries in the compartment 60. Thus, in accordance with the present invention there is provided a primemover excited from a contained energy source which is adapted to propel the pipeline treating unit along the length of the pipeline. The unit is articulated so that it may negotiate changes in direction in the pipeline and still carry out its intended function. The linkage between the servicing unit and the pipeline afforded by the wheels 15 and 16 and the like may be employed not only for the purpose of traction in a self-propelled device but also to exert a measure of speed control over such a pipeline unit. In the latter case the unit 31 may serve as a generator to feed a suitable load so that a variable breaking action is provided for the unit. In this case the unit may be propelled not by energy from a source such as the source 60 but by an independent source or by the application of pneumatic pressure to the trailing cup 83. In this case a switch such as switch 110, FIG. 3, is actuated to connect a load unit represented by resistance 111 across the output terminals of the unit 31. Unit 31, operating as a generator, is thus loaded to control speed of the pipeline service unit. In the latter case the gears 15a and 31d would be modified to permit driving the unit 31 from the tractive forces developed between the pipeline walls and wheels 15 and 16 as readily understood by those skilled in the art. In such case the coating operation will be carried on by applying gas pressure to the trailing cup 83, energizing the pump motor 29 from batteries 60 to supply coating material with speed control maintained by the traction at the front of the unit.

Alternatively, it may be desirable to employ the present system together with a pair of leading cups as disclosed in the above-identified Curtis et al, patent whereby the back pressure maintained on coating material between a leading pair of cups and a trailing pair of cups would be derived from the traction on the leading portion of the coating system as illustrated in FIG. 3.

Having described the invention in connection with certain specific embodiments thereof, it is to be understood that further modifications may now suggest themselves to those skilled in the art and it is intended to cover such modifications as fall within the scope of the appended claims.

What is claimed is:

1. An interiorly operating pipeline system which comprises:
    (a) a pipeline coating unit having a pair of partially nested cups each formed to engage the wall of the pipeline to two longitudinally spaced zones,
    (b) a pair of coating constituent storage units,
    (c) a traction unit,
    (d) articulated couplings between the units,
    (e) said traction unit being provided with rolling means including at least one traction wheel adapted for firm frictional rolling engagement with the pipeline inside surface and adapted to generate propelling and braking forces through said rolling means,
    (f) gas control means for each of said storage units,
    (g) flow lines leading from said storage units, and
    (h) a pump and mixer unit connected to said flow lines and adapted to deliver a mixture of said constituents to said coating unit between said cups.

2. The combination set forth in claim 1 in which said cups open rearwardly of said unit with the rims of said cups each terminating in pneumatic rings, the surfaces of which are adapted to contact said wall at two longitudinally spaced circumferential zones.

References Cited in the file of this patent

UNITED STATES PATENTS

| | | |
|---|---|---|
| 2,106,004 | Inglee | Jan. 18, 1938 |
| 2,194,701 | Harrison | Mar. 26, 1940 |
| 2,333,451 | Sussman et al. | Nov. 2, 1943 |
| 2,399,544 | Danner | Apr. 30, 1946 |
| 2,698,449 | Rafferty | Jan. 4, 1955 |
| 2,865,541 | Hicks | Dec. 23, 1958 |
| 2,887,118 | Loeffler et al. | May 19, 1959 |
| 2,910,042 | Gallmeyer et al. | Oct. 27, 1959 |
| 3,029,027 | Gray | Apr. 10, 1962 |
| 3,039,428 | McLean | June 19, 1962 |
| 3,056,155 | Harmes | Oct. 2, 1962 |
| 3,058,137 | Doyle | Oct. 16, 1962 |

FOREIGN PATENTS

| | | |
|---|---|---|
| 1,197,088 | France | June 1, 1959 |